US012776485B2

(12) United States Patent
Kang et al.

(10) Patent No.: US 12,776,485 B2
(45) Date of Patent: Oct. 27, 2026

(54) ELECTRODE

(71) Applicant: LG Energy Solution, Ltd., Seoul (KR)

(72) Inventors: Joon Koo Kang, Daejeon (KR); Ki Hwan Kim, Daejeon (KR); Il Ha Lee, Daejeon (KR); Sang Joon Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 698 days.

(21) Appl. No.: 18/028,928

(22) PCT Filed: Sep. 27, 2021

(86) PCT No.: PCT/KR2021/013156
§ 371 (c)(1),
(2) Date: Mar. 28, 2023

(87) PCT Pub. No.: WO2022/071704
PCT Pub. Date: Apr. 7, 2022

(65) Prior Publication Data

US 2023/0335709 A1 Oct. 19, 2023

(30) Foreign Application Priority Data

Sep. 29, 2020 (KR) ........................ 10-2020-0127553

(51) Int. Cl.
*H01M 4/137* (2010.01)
*H01M 4/04* (2006.01)
(Continued)

(52) U.S. Cl.
CPC ......... *H01M 4/137* (2013.01); *H01M 4/0404* (2013.01); *H01M 4/0466* (2013.01);
(Continued)

(58) Field of Classification Search
None
See application file for complete search history.

(56) References Cited

U.S. PATENT DOCUMENTS

| | | | |
|---|---|---|---|
| 2004/0058232 | A1 | 3/2004 | Kim et al. |
| 2011/0117454 | A1 | 5/2011 | Winther-Jensen et al. |

(Continued)

FOREIGN PATENT DOCUMENTS

| | | | |
|---|---|---|---|
| CN | 105390678 | A | 3/2016 |
| EP | 3537516 | A1 | 9/2019 |

(Continued)

OTHER PUBLICATIONS

Extended European Search Report including Written Opinion for Application No. 21875979.3 dated Oct. 16, 2024, pp. 1-10.

(Continued)

*Primary Examiner* — Scott J. Chmielecki
(74) *Attorney, Agent, or Firm* — Lerner David LLP

(57) ABSTRACT

The present application relates to an electrode, a method for manufacturing the electrode, and a secondary battery comprising the electrode. The present application relates to an electrode comprising a current collector, an active material layer, and a thiophene polymer layer formed on the active material layer and can provide an electrode capable of ensuring a higher level of adhesion force between particles and adhesion force between the active material layer and the current collector relative to the binder content in the active material layer. In addition, the present application can provide a method for manufacturing the electrode, and a secondary battery comprising the same.

17 Claims, 2 Drawing Sheets

(51) Int. Cl.
*H01M 4/1399* (2010.01)
*H01M 4/38* (2006.01)
*H01M 10/052* (2010.01)

(52) U.S. Cl.
CPC ......... *H01M 4/1399* (2013.01); *H01M 4/382* (2013.01); *H01M 10/052* (2013.01)

(56) References Cited

U.S. PATENT DOCUMENTS

| | | | | |
|---|---|---|---|---|
| 2017/0190579 | A1* | 7/2017 | Cola | C01B 32/168 |
| 2019/0058185 | A1 | 2/2019 | Lee et al. | |
| 2019/0334166 | A1* | 10/2019 | Ishii | H01M 4/1399 |
| 2020/0067075 | A1* | 2/2020 | Choi | H01M 4/624 |
| 2021/0111407 | A1* | 4/2021 | Li | H01M 4/13 |

FOREIGN PATENT DOCUMENTS

| | | | | |
|---|---|---|---|---|
| IN | 2011MU02581 | A | * | 3/2013 |
| JP | 2007165095 | A | | 6/2007 |
| JP | 2013016364 | A | | 1/2013 |
| KR | 20040026208 | A | | 3/2004 |
| KR | 20170099375 | A | | 8/2017 |
| KR | 20180020599 | A | | 2/2018 |
| KR | 101990613 | B1 | | 6/2019 |
| KR | 102003291 | B1 | | 7/2019 |

OTHER PUBLICATIONS

International Search Report for PCT/KR2021/013156 mailed Jan. 13, 2022. 3 pgs.
Search Report dated Apr. 13, 2026 from the Office Action for Chinese Application No. 202180067056.7 issued Apr. 17, 2026, pp. 1-2.

* cited by examiner

ELECTRODE

CROSS-REFERENCE TO RELATED APPLICATIONS

The present application is a national stage entry under 35 U.S.C. § 371 of International Application No. PCT/KR2021/013156 filed on Sep. 27, 2021, which claims priority from Korean Patent Application No. 10-2020-0127553 filed on Sep. 29, 2020, all the disclosures of which are incorporated herein by reference.

TECHNICAL FIELD

This application relates to an electrode.

BACKGROUND ART

In energy storage technologies, their application area expands to mobile phones, camcorders, notebook PCs, electric vehicles, and the like.

One of the research fields in energy storage technology is a secondary battery capable of charging and discharging, and a lithium secondary battery is typically known.

A typical lithium secondary battery uses a lithium transition metal oxide as a positive electrode active material and a graphite-based material as a negative electrode active material, but attempts have been made to replace the active materials for improvement of the energy density in the battery.

For example, it is known to replace part or all of the graphite-based material used as the negative electrode active material with a silicon-based active material. The silicon-based active material has a storage capacity (specific capacity) of about 3600 mAh/g or so, which is nearly ten times higher than that of the graphite-based active material (370 mAh/g). However, the silicone-based active material has a problem in terms of stability because the ratio of the expansion volume to the contraction volume of the silicone component during charging and discharging is in a level of 270% to 400%, which is excessively high compared to the case of the graphite-based material (a level of 10%).

As another attempt, there is also an attempt intended to apply a lithium metal layer as the negative electrode active material layer.

Lithium metal is an element having a low oxidation/reduction potential among metal elements, and exhibits high capacities per weight and volume of 3,860 mAh/g and 2,060 $mAh/cm^3$ when used as the negative electrode. Therefore, the negative electrode to which the lithium metal layer is applied may exhibit excellent characteristics in terms of energy density determined by the capacity and operating voltage.

However, since the lithium metal exhibits intense reactivity in a conventional aqueous electrolyte, it is not easy to apply it as a negative electrode material.

In order to use the lithium metal as the negative electrode material, problems of poor electrode lifetime characteristics (cycle life) and thermal stability of lithium metal must be solved.

Because the lithium metal is highly reactive, it forms $Li_2CO_3$, LiOH and $Li_2O$, and the like depending on the type of gases present in the atmospheric air, when exposed to the atmospheric air. Because it is porous, a passivation film is formed on a surface by reaction with a solute or solvent, and the like in an electrolyte when it comes into contact with the electrolyte. Accordingly, when the charging and discharging of a battery using the lithium metal as the negative electrode material is continued, the amount of lithium metal is consumed according to the formation of the passivation film, and simultaneously performance is deteriorated.

In addition, the passivation film or the like does not only make the current density of the surface non-uniform, but also reduces the surface area required for dissolution and deposition of lithium.

The type of deposited lithium is related to the charge-discharge current density, the type of electrolyte, and the growth of Li in the form of dendrite, moss or sphere. For example, a part of lithium growing in the form of dendrite is cut off during discharge, thereby forming dead Li, which cannot be electrochemically charged and discharged and has strong chemical reactivity.

Due to the formation of such dead Li and passivation film, reversible charging and discharging of lithium becomes difficult, upon using lithium metal as a negative electrode material, and as a result, it is difficult to ensure electrode lifetime characteristics and thermal stability even in a non-aqueous electrolyte.

Despite the high theoretical capacity of lithium metal as described above, its use as a negative electrode material is not easily achieved because of electrode lifetime characteristic deterioration and thermal instability due to strong reactivity on its surface.

DISCLOSURE

Technical Problem

The present application relates to an electrode. The present application relates to a negative electrode in which a lithium metal layer is applied as an active material layer, and it is one object to provide a negative electrode material capable of solving various problems of the lithium metal layer as described above while taking a high theoretical capacity which is an advantage of the lithium metal layer.

Technical Solution

Among physical properties mentioned in this specification, the physical property in which the measurement temperature affects the results is a result measured at room temperature, unless otherwise specified.

The term room temperature is a natural temperature without warming or cooling, and for example, means any one temperature within a range of 10° C. to 30° C., or a temperature of about 23° C. or about 25° C. or so. In addition, in this specification, the unit of temperature is Celsius (° C.), unless otherwise specified.

Among physical properties mentioned in this specification, the physical property in which the measurement pressure affects the results is a result measured at normal pressure, unless otherwise specified.

The term normal pressure is a natural pressure without pressurization or depressurization, and usually means about 1 atmosphere or so in a level of atmospheric pressure.

In this specification, in the case of a physical property in which the measurement humidity affects the results, the relevant physical property is a physical property measured at natural humidity that is not specifically controlled at room temperature and/or normal pressure states.

The electrode of the present application comprises a current collector; and an active material layer and a thiophene polymer layer present on one side of the current collector. FIG. 1 is a cross-sectional diagram of such an electrode, and shows a structure comprising a current collector (100), an active material layer (200) and a thiophene polymer layer (300). In the electrode structure, other layers may also exist between the active material layer and the current collector and/or between the active material layer and the thiophene polymer layer.

In one example, the active material layer in the electrode may be a lithium layer. Such an electrode may be used, for example, as a negative electrode for a secondary battery, specifically, a negative electrode for a lithium secondary battery.

The type of the current collector applied in the present application is not particularly limited, where a known current collector may be used. In general, a metal film, a metal sheet or a metal foil, and the like is used as the current collector. The current collector includes, for example, a film, sheet or foil, and the like, made of stainless steel, aluminum, nickel, titanium, sintered carbon, copper, carbon, stainless steel surface-treated with nickel, titanium or silver, an aluminum-cadmium alloy, and the like, but is not limited thereto.

The thickness and shape, and the like of the current collector are not particularly limited, and an appropriate type is selected within a known range.

The type of the active material layer formed on the current collector is not particularly limited, where various types may be used, but in one example, the active material layer may be a lithium layer. The lithium layer is a layer comprising lithium or a lithium alloy, and specifically, a layer comprising lithium or a lithium alloy that can act as a negative electrode active material. Since such a lithium layer has a high theoretical capacity, it is possible to form a battery with a high energy density. However, the lithium layer causes various problems due to its high surface reactivity and porosity, where these problems can be solved by the thiophene polymer layer formed in the present application. Accordingly, in the present application, it is possible to provide an electrode in which the disadvantages of the lithium layer are eliminated while taking the advantages of the lithium layer.

The lithium layer is an active material layer capable of reversible intercalation and deintercalation, which comprises lithium or a lithium alloy.

The lithium alloy may be, for example, an alloy of lithium with one or more selected from the group consisting of silicon (Si), aluminum (Al), tin (Sn), lead (Pb), zinc (Zn), bismuth (Bi), indium (In), magnesium (Mg), gallium (Ga) and cadmium (Cd).

Materials, components, and formation methods of a lithium layer that can be applied as an active layer are known in the industry, and these known matters can be applied without limitation in the present application.

The thickness of the lithium layer may also be selected from a known range, and for example, an appropriate thickness may be selected within the range of about 10 μm to 50 μm.

In the electrode of the present application, a thiophene polymer layer is formed on the lithium layer. In the present application, by applying a specific type as the thiophene polymer layer, it is possible to form a stably uniform polymer layer on the highly reactive and porous lithium layer. Such a polymer layer can stably block unnecessary reactions due to contact between the lithium layer and other components (air, electrolyte, etc.), thereby solving the problems that occur in applying the lithium layer as the negative electrode material. In addition, since the thiophene polymer layer has an appropriate level of oxidation potential and ion conductivity, the exchange of ions and the like between the lithium layer and the electrolyte during the battery operation process may be rather improved without being interfered, so that the advantages of the lithium layer may be rather improved without being harmed.

In this specification, the term thiophene polymer or polythiophene means a polymer comprising about 50 mol % or more, 55 mol % or more, 60 mol % or more, 65 mol % or more, 70 mol % or more, 75 mol % or more, 80 mol % or more, 85 mol % or more, or 90 mol % or more of the polymerized unit of the thiophene-based monomer relative to the total polymerized unit of the polymer. The upper limit of the polymerized unit ratio of the thiophene-based monomer in the thiophene polymer or polythiophene is not particularly limited, which may be, for example, 100 mol % or less, 95 mol % or less, or 90 mol % or less or so.

The thiophene polymer layer is a layer comprising 70 weight % or more, 75 weight % or more, 80 weight % or more, 85 weight % or more, 90 weight % or more, or 95 weight % or more such a thiophene polymer or polythiophene on the basis of weight. The upper limit of the content of the thiophene polymer or polythiophene in the thiophene polymer layer is 100 weight %. When the thiophene polymer layer also comprises other components in addition to the thiophene polymer or polythiophene, the type thereof is not particularly limited, and the other components may be, for example, known necessary additives, or residues of the solvents applied in the process of forming the polymer layer, and the like.

In the present application, as the thiophene polymer layer, one having a carboxyl group, a hydroxy group, a nitro group, an amino group, an ether group and/or a carbonyl group is applied.

Through the application of the functional group, the thiophene polymer layer can be bound to the lithium layer to have an appropriate binding force, and the desired protective function can be efficiently achieved by uniformly forming the thiophene polymer layer.

The thiophene polymer layer may further include a flowable functional group together with the functional group.

The flowable functional group is a functional group capable of imparting appropriate mobility at the polymerization process of the thiophene polymer or to the thiophene polymer itself. The monomer including such a flowable functional group imparts appropriate flowability to the monomer mixture and diffuses in the monomer mixture, thereby allowing polymerization to occur with excellent efficiencies. In addition, the thiophene polymer having a flowable functional group may allow the polymer layer to be stably and uniformly formed even on a porous and highly reactive lithium layer through appropriate flowability.

The type of the flowable functional group is not particularly limited as long as it plays the above role, but a chain having a length greater than or equal to a certain level can effectively impart the desired flowability in the present application.

Such a flowable functional group may be exemplified by an alkyl group with 3 or more carbon atoms, an alkoxy group with 3 or more carbon atoms, an alkylcarbonyl group with 3 or more carbon atoms (an alkylcarbonyl group having an alkyl group with 3 or more carbon atoms), an alkylcarbonyloxy group with 3 or more carbon atoms (an alkylcarbonyloxy group having an alkyl group with 3 or more carbon atoms) or a functional group of the following formula 1, and in general, an alkyl group with 3 or more carbon atoms, an alkoxy group with 3 or more carbon atoms and/or a functional group of the following formula 1 may be used, without being limited thereto.

[Formula 1]

$$-L_1-[O-L_2]_n-O-R_1$$

In Formula 1, $L_1$ is a single bond or an alkylene group, $L_2$ is an alkylene group, $R_1$ is an alkyl group, and n is a number within a range of 1 to 10.

The alkyl group (except for $R_1$ in Formula 1) or the alkoxy group, in one example, may have 4 or more, 5 or more, or 6 or more carbon atoms, and may also have 20 or less, 18 or less, 16 or less, 14 or less, 12 or less, 10 or less, 8 or less, 6 or less, or 5 or less carbon atoms. The alkyl group may be linear, branched or cyclic, and may be suitably linear or branched.

In one example, the alkyl group of $R_1$ in Formula 1 may be an alkyl group with 1 to 20 carbon atoms, 1 to 16 carbon atoms, 1 to 12 carbon atoms, 1 to 8 carbon atoms or 1 to 4 carbon atoms, or may be a methyl group or an ethyl group. The alkyl group may be linear, branched or cyclic, and may be suitably linear or branched.

In one example, the alkylene group of $L_1$ and $L_2$ in Formula 1 may be an alkylene group with 1 to 20 carbon atoms, 1 to 16 carbon atoms, 1 to 12 carbon atoms, 1 to 8 carbon atoms or 1 to 4 carbon atoms, or may be an alkylene group with 2 to 4 carbon atoms. The alkylene group may be linear, branched or cyclic, and may be suitably linear or branched.

In another example, n in Formula 1 may be 2 or more, 3 or more, or 4 or more, or may be 9 or less, 8 or less, 7 or less, 6 or less, 5 or less, or 4 or less or so.

The mole number of the functional groups (carboxyl group, hydroxy group, nitro group, amino group, ether group, carbonyl group, and/or flowable functional group) in the thiophene polymer layer may be controlled in order to ensure an appropriate effect. For example, the ratio (M/S) of the total mole number (M) the functional groups (carboxyl group, hydroxy group, nitro group, amino group, ether group, carbonyl group and/or flowable functional group) to the mole number (S) of sulfur atoms in the thiophene polymer layer may be in a range of 0.1 to 10. In another example, the ratio (M/S) may be 0.3 or more, 0.5 or more, 0.7 or more, 0.9 or more, 1 or more, 1.5 or more, or 2 or more, or may be 9 or less, 8 or less, 7 or less, 6 or less, 5 or less, 4 or less, 3 or less or 2.5 or less or so.

In one example, the thiophene polymer layer may include one or more functional groups (hereinafter, first functional groups) selected from the group consisting of a carboxyl group, a hydroxy group, a nitro group, an amino group, an ether group and a carbonyl group together with a flowable functional group. Here, the flowable functional group may be referred to as a second functional group.

When the functional group is included as above, the ratio (M1/M2) of the mole number (M1) of the first functional group to the mole number (M2) of the second functional group in the thiophene polymer may be in a range of 0.5 to 10. In another example, the ratio (M1/M2) may be 0.7 or more, 0.9 or more, 1 or more, 1.5 or more, 2 or more, 2.5 or more, or 3 or more, or may also be 9 or less, 8 or less, 7 or less, 6 or less, 5 or less, 4 or less, 3.5 or less, 3 or less, 2.5 or less, 2 or less, or 1.5 or less or so.

In one example, the thiophene polymer layer may include a polymerized unit of the following formula 2.

The unit of the following structure may allow the thiophene polymer to exhibit electrical properties such as an oxidation potential suitable in the present application by two oxygen atoms connected to the thiophene structure, and increases the chain binding force of the thiophene polymer, so that the polymer has high resistance to various solvents or external substances, thereby effectively forming a thiophene polymer layer having the properties required for the present application.

[Formula 2]

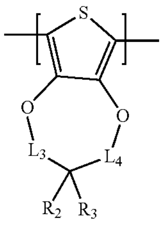

In Formula 2, $L_3$ and $L_4$ are each independently a single bond or an alkylene group, $R_2$ is a carboxyl group, a carboxylalkyl group, a hydroxy group, a hydroxyalkyl group, an amino group, an aminoalkyl group, a nitro group, an ether-containing group, a carbonyl-containing group or a flowable functional group, and $R_3$ is hydrogen, a carboxyl group, a carboxylalkyl group, a hydroxy group, a hydroxyalkyl group, an amino group, an aminoalkyl group, a nitro group, an ether-containing group, a carbonyl-containing group or a flowable functional group.

In Formula 2, the alkylene group may be a linear, branched or cyclic alkylene group with 1 to 20 carbon atoms, 1 to 16 carbon atoms, 1 to 12 carbon atoms, 1 to 8 carbon atoms, or 1 to 4 carbon atoms.

In a suitable example, $L_3$ and $L_4$ in Formula 2 above are each independently a single bond or an alkylene group, where at least one is an alkylene group (e.g., a linear alkylene group), and the sum of carbon atoms of the alkylene groups present in $L_3$ and $L_4$ may be in the range of 1 to 20. In another example, the sum of carbon atoms may be 2 or more, or 3 or more, or may also be 16 or less, 12 or less, 8 or less, or about 4 or less or so. The alkylene group of $L_3$ and $L_4$ may be optionally substituted with an appropriate substituent, for example, a carboxyl group, a hydroxy group, an amino group or a nitro group, or one or more ether groups and/or carbonyl groups may be present in the chain structure.

In Formula 2, the alkyl group may be a linear, branched or cyclic alkyl group with 1 to 20 carbon atoms, 1 to 16 carbon atoms, 1 to 12 carbon atoms, 1 to 8 carbon atoms or 1 to 4 carbon atoms.

Also, in Formula 2, an example of the ether-containing group or the carbonyl-containing group may be exemplified by a hydrocarbon chain having one or more ether groups or carbonyl groups in the chain structure. For example, the hydrocarbon chain may be exemplified by a linear, branched or cyclic alkyl group with 1 to 20 carbon atoms, 1 to 16 carbon atoms, 1 to 12 carbon atoms, 1 to 8 carbon atoms or 1 to 4 carbon atoms; a linear, branched or cyclic alkenyl group with 2 to 20 carbon atoms, 2 to 16 carbon atoms, 2 to 12 carbon atoms, 2 to 8 carbon atoms or 2 to 4 carbon atoms, or a linear, or branched with 2 to 20 carbon atoms, 2 to 16 carbon atoms, 2 to 12 carbon atoms, 2 to 8 carbon atoms or 2 to 4 carbon atoms, and the like, but is not limited thereto.

In Formula 2, specific types of the flowable functional groups are as described above.

The thiophene polymer or polythiophene of the present application may comprise about 50 mol % or more, 55 mol % or more, 60 mol % or more, 65 mol % or more, 70 mol % or more, 75 mol % or more, 80 mol % or more, 85 mol % or more, or 90 mol % or more of the polymerized unit of Formula 2 above, relative to the total polymerized unit of the polymer. The polymerized unit of Formula 2 above may be included in, for example, 100 mol % or less, 95 mol % or less, or 90 mol % or less or so in the thiophene polymer or polythiophene. When the thiophene polymer or polythiophene includes other polymerized units in addition to the polymerized unit of Formula 2 above, the other polymerized units may be other thiophene-based monomers rather than the polymerized unit of Formula 2 above, or may also be other monomers rather than the thiophene-based monomers.

In one example, the thiophene polymer layer may simultaneously include, as the polymerized unit of Formula 2 above, a polymerized unit of Formula 3 below and a polymerized unit of Formula 4 below.

[Formula 3]

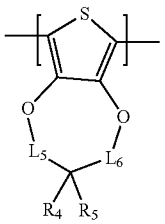

In Formula 3, $L_5$ and $L_6$ are each independently a single bond or an alkylene group, $R_4$ is a carboxyl group, a carboxyalkyl group, a hydroxy group, a hydroxyalkyl group, an amino group, an aminoalkyl group, a nitro group, an ether-containing group or a carbonyl-containing group, and $R_5$ is hydrogen, a carboxyl group, a carboxylalkyl group, a hydroxy group, a hydroxyalkyl group, an amino group, an aminoalkyl group, a nitro group, an ether-containing group or a carbonyl-containing group.

[Formula 4]

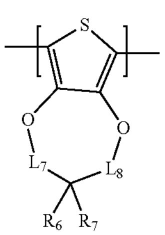

In Formula 4, $L_7$ and $L_8$ are each independently a single bond or an alkylene group, $R_6$ is a flowable functional group, and $R_7$ is hydrogen or a flowable functional group.

Specific details of the alkylene group, the flowable functional group, the alkyl group, the ether-containing group and the carbonyl-containing group in Formulas 3 and 4 are the same as those described in Formula 2 above.

Also, $L_5$ and $L_6$ of Formula 3 above are each independently a single bond or an alkylene group, where at least one is an alkylene group (e.g., a linear alkylene group), and the sum of carbon atoms of the alkylene groups present in $L_5$ and $L_6$ may be in the range of 1 to 20. In another example, the sum of carbon atoms may be 2 or more or 3 or more, or may also be 16 or less, 12 or less, 8 or less, or about 4 or less or so. The alkylene group of $L_3$ and $L_4$ above may be optionally substituted with an appropriate substituent, for example, a carboxyl group, a hydroxy group, an amino group or a nitro group, or one or more ether groups and/or carbonyl groups may also be present in the chain structure.

In addition, $L_7$ and $L_8$ of Formula 4 above are each independently a single bond or an alkylene group, where at least one is an alkylene group (e.g., a linear alkylene group), and the sum of carbon atoms of the alkylene groups present in $L_7$ and $L_8$ may be in the range of 1 to 20. In another example, the sum of carbon atoms may be 2 or more or 3 or more, or may also be 16 or less, 12 or less, 8 or less, or about 4 or less or so. The alkylene group of $L_3$ and $L_4$ above may be optionally substituted with an appropriate substituent, for example, a carboxyl group, a hydroxy group, an amino group or a nitro group, or one or more ether groups and/or carbonyl groups may also be present in the chain structure.

When the thiophene polymer includes the polymerized units of Formulas 3 and 4 above simultaneously, the ratio (M4/M5) of the mole number (M4) of the polymerized units of Formula 3 above to the mole number (M5) of the polymerized units of Formula 4 may be in the range of 0.1 to 10. In another example, the ratio may be 0.3 or more, 0.5 or more, 0.7 or more, 0.9 or more, 1 or more, 1.5 or more, 2 or more, or 2.5 or more, or may be 9 or less, 8 or less, 7 or less, 6 or less, 5 or less, 4 or less, 3.5 or less more, 3 or less, 2.5 or less, 2 or less, or 1.5 or less or so.

In such a ratio, a desired effect can be effectively secured through simultaneous application of the polymerized unit of Formula 3 and the polymerized unit of Formula 4.

The thiophene polymer of the thiophene polymer layer may have a weight average molecular weight (Mw) in a range of 500 to 100,000. The weight average molecular weight may be measured by the GPC (gel permeation chromatograph) method described in Examples, where the unit is g/mol. In another example, the molecular weight (Mw) may be 1000 or more, 1500 or more, 2000 or more, 2500 or more, 3000 or more, 3500 or more, 4000 or more, 4500 or more, 5000 or more, 5500 or more, 6000 or more, 6500 or more, 7000 or more, 7500 or more, 8000 or more, 8500 or more, or 9000 or more, or may also be 90000 or less, 80000 or less, 70000 or less, 60000 or less, 50000 or less, 40000 or less, 30000 or less, 20000 or less, or 10000 or less or so.

The thiophene polymer layer or the thiophene polymer may exhibit a suitable oxidation potential required in the present application due to its unique structure.

For example, the oxidation potential of the thiophene polymer layer or the thiophene polymer may be in a range of 1.5 to 5V. The oxidation potential may be identified with a known potentiometer. In another example, the oxidation potential may be 2V or more, or 2.5V or more, or may also be 4.5V or less, 4V or less, 3.5V or less, or 3V or less or so. The thiophene polymer layer or thiophene polymer having the oxidation potential is effectively doped by the operating potential during the operation procedure of a secondary battery (especially a lithium secondary battery), thereby allowing the desired excellent ionic conductivity to be achieved.

The thickness of such a thiophene polymer layer is not particularly limited, but may be in a range of about 100 nm to 10 μm in consideration of the efficiency of achieving the purpose. In another example, the thickness may be 150 nm or more, 200 nm or more, 250 nm or more, 300 nm or more, 350 nm or more, 400 nm or more, or 450 nm or more, or may also be 9000 nm or less, 8000 nm or less, 7000 nm or less, 6000 nm or less, 5000 nm or less, 4000 nm or less, 3000 nm or less, 2000 nm or less, 1000 nm or less, 900 nm or less, 800 nm or less, 700 nm or less, 600 nm or less, or 550 nm or less or so.

By setting the thickness of the thiophene polymer layer within the above range, more appropriate ion conductivity and protective function may be secured, and cycle characteristics of the battery to which the electrode is applied may also be maintained excellently.

The present application also relates to a method for manufacturing the electrode.

Such a manufacturing method of the present application may comprise a step of forming the thiophene polymer layer having one or more functional groups selected from the group consisting of a carboxyl group, a hydroxy group, a nitro group, an amino group, an ether group, a carbonyl group, or a flowable functional group on the lithium layer of the laminate having the current collector and the lithium layer.

In the method, a method of forming the thiophene polymer layer is not particularly limited. For example, the thiophene polymer layer may be formed by coating a coating composition comprising a thiophene polymer on the lithium layer, or by directly polymerizing a thiophene monomer on the lithium layer.

The preparation and coating methods, and the like of the coating composition for forming the thiophene polymer layer are not particularly limited, and any method of known coating methods may be applied.

In addition, a method of polymerizing the thiophene monomer is not particularly limited, and a known method may be applied. For example, as a method for preparing polythiophene, a method using an oxidation reaction or a method using a radical reaction is typically known, and such a method may be applied without limitation in the present application.

Also, in the manufacturing process of the present application, a post process such as an appropriate drying process may also be additionally performed following the coating and/or polymerization process.

The polymerization of the thiophene polymer may be performed using a monomer represented by Formula 5 below.

[Formula 5]

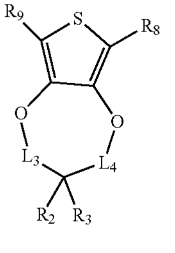

In Formula 5, $L_3$ and $L_4$ are each independently a single bond or an alkylene group, $R_2$ is a carboxyl group, a carboxylalkyl group, a hydroxy group, a hydroxyalkyl group, an amino group, an aminoalkyl group, a nitro group, an ether-containing group, a carbonyl-containing group or a flowable functional group, $R_3$ is hydrogen, a carboxyl group, a carboxylalkyl group, a hydroxy group, a hydroxyalkyl group, an amino group, an aminoalkyl group, a nitro group, an ether-containing group, a carbonyl-containing group or a flowable functional group, and $R_8$ and $R_9$ are each independently hydrogen or halogen.

The monomer of Formula 5 above is a monomer forming the polymerized unit of Formula 2, Formula 3 or Formula 4, and thus, in Formula 5, the matters relating to an alkylene group of $L_3$ and $L_4$, and the like, and an alkyl group, an ether-containing group, a carbonyl-containing group or a flowable functional group of $R_2$ are the same as described above.

The monomer of Formula 5 above can be synthesized by applying a known general synthesis method, and those skilled in the art can easily synthesize the monomer of Formula 5 above based on the synthesis method described in Examples of this specification.

In the polymerization process for forming the thiophene polymer of the present application, other thiophene-based or non-thiophene-based monomers rather than the monomer of Formula 5 above may also be applied.

The present application also relates to an electrochemical element comprising such an electrode, for example, a secondary battery.

The battery chemical element may comprise the electrode as a positive electrode and/or a negative electrode. As long as the electrode of the present application is used as a negative electrode and/or a positive electrode, other constitutions or manufacturing methods of the electrochemical element are not particularly limited, and a known method may be applied.

Advantageous Effects

The present application relates to a negative electrode in which a lithium metal layer is applied as an active material layer, and it is one object to provide a negative electrode material capable of solving various problems of the lithium metal layer while taking a high theoretical capacity which is an advantage of the lithium metal layer.

MODE FOR INVENTION

Figure 1:
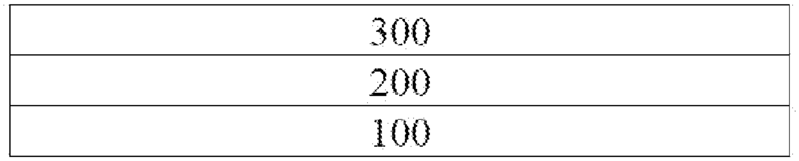
FIG. 1 is a cross-sectional diagram of an exemplary electrode of the present application.

Hereinafter, the laminate of the present application and the like will be specifically described through Examples and Comparative Examples, but the scope of the laminate of the present application and the like is not limited by the following examples.

1. NMR Analysis Method

1H-NMR analyses in Examples and Synthesis Examples were performed at room temperature using an NMR spectrometer including a Bruker UltraShield (300 MHz) spectrometer having a triple resonance 5 mm probe. An analyte material was diluted to a concentration of about 10 mg/ml or so in a solvent ($CDCl_3$) for NMR measurement and used, where the chemical shift was expressed in ppm.

2. GPC (Gel Permeation Chromatograph)

Number average molecular weights (Mn) and molecular weight distributions were measured using GPC (gel permeation chromatography). Polymers of Examples, etc. were each put in a 5 mL vial, and diluted in chloroform to a concentration of about 1 mg/mL or so. Thereafter, the standard sample for calibration and the sample to be analyzed were filtered through a syringe filter (pore size: 0.45 μm) and then measured. As the analysis program, Waters' Empower 3 was used, and the weight average molecular weight (Mw) and number average molecular weight (Mn) were each obtained by comparing the elution time of the sample with the calibration curve, and the molecular weight distribution (PDI) was calculated as the ratio (Mw/Mn). The measurement conditions of GPC are as follows.

<GPC Measurement Conditions>

Instrument: 2414 from Waters

Column: using 3 Styragel from Waters

Solvent: THF

Column temperature: 35° C.

Sample concentration: 1 mg/mL, 1 mL injection

Standard sample: Polystyrene (Mp: 3900000, 723000, 316500, 52200, 31400, 7200, 3940, 485)

3. Thickness Measurement of Thiophene Polymer Layer

A thickness of a thiophene polymer layer was measured using an SEM (Scanning Electron Microscope) (Hitachi, S4800) after the electrode was cross-sectioned using an ion milling equipment (Hitachi, IM4000).

4. Ionic Conductivity Measurement Method

A thiophene polymer was prepared in a disk-shaped sample with a diameter of 1.3 cm, where the thiophene polymer sample was placed between two disk-shaped stainless steels with the same diameter as above to prepare a sandwich structure and electrodes were connected to the stainless steels, and then it was evaluated using a potentiometer (Princeton Applied Research, Parstat 2273).

5. Cycle Retention Measurement Method

Cycle retention was evaluated by manufacturing a coin cell. Upon manufacturing the coin cell, the electrodes of Examples or Comparative Examples were each applied as a negative electrode, a positive electrode containing lithium nickel-manganese-cobalt oxide as an active material was applied as a positive electrode, and an $LiPF_6$ 1M solution (solvent: EC/EMC/DMC=3:3:4 mass ratio) was used as an electrolyte.

An electrode prepared by applying a slurry comprising lithium nickel-manganese-cobalt oxide (LixMyO2, wherein M is Ni1-a-bMnaCob, a is 0.2, b is 0.2, and x is 1.05), a carbon-based conductive material (ECP (Ketjen Black) 0.5%, SFG (Trimrex graphite) 0.4%, DB (Denka Black) 0.4%), PVDF (polyvinylidene fluoride) and NMP (N-methyl-2-pyrrolidone) in a weight ratio of 75:1:1:23 on an aluminum current collector (thickness: 20 μm) with a doctor blade to a thickness of about 40 μm or so, and drying it at room temperature, following further drying and rolling under vacuum conditions at 120° C. was used as the positive electrode.

The capacity of a battery having a reference capacity of 170 mAh/g was measured after performing 30 charge/discharge cycles at 25° C., and a ratio to the initial capacity was calculated. The 30 charge/discharge cycles mean that a process of setting the charge cutoff voltage to 4.3V and the charge cutoff current to 0.2 mA to charge it in the CC (constant current)/CV (constant voltage) method at a rate of 0.33 C and setting the discharge cutoff voltage to 2.5V to discharge it in the CC (constant current) method at a rate of 0.33 C as one cycle is carried out 30 times repeatedly. Cycle retention was measured as the ratio of the discharge capacity after 30 repetitions to the discharge capacity after one charge/discharge.

Preparation Example 1. Synthesis of Monomer (A)

Compound 1 (3,4-[2,2'-bis(bromomethyl)propylenedioxy]thiophene) of Scheme 1 below was synthesized in the following manner.

[Scheme 1]

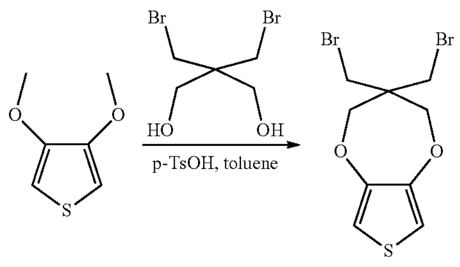

Compound 1

5 g (34.68 mmol, 1 eq) of 3,4-dimethoxythiophene and 10.9 g (41.61 mmol, 1.2 eq) of 2,2-bisbromomethyl-1,3-propanediol were mixed by dissolving them in 200 ml of toluene together with 500 mg of p-toluenesulfonic acid (p-TsOH). The mixture was reacted under reflux at 120° C. to remove methanol generated by the reaction (transetherification) with a 4A type molecular sieve charged with a soxhlet extractor. The reactant was quenched with water after refluxing for 24 hours, extracted with ethyl acetate, and then washed with brine, and dried over magnesium sulfate ($MgSO_4$). The solvent was removed by a rotary evaporator, and the residue was purified by column chromatography eluting with methylene chloride/hexane (1:4) to obtain Compound 1 above (3,4-(2,2'-bis(bromomethyl)propylenedioxy)thiophene).

Subsequently, Compound 1 above was used to synthesize Compound 2 (3,4-[2,2'-bis(carboxymethyl)propylenedioxy]thiophene) of Scheme 2 below.

[Scheme 2]

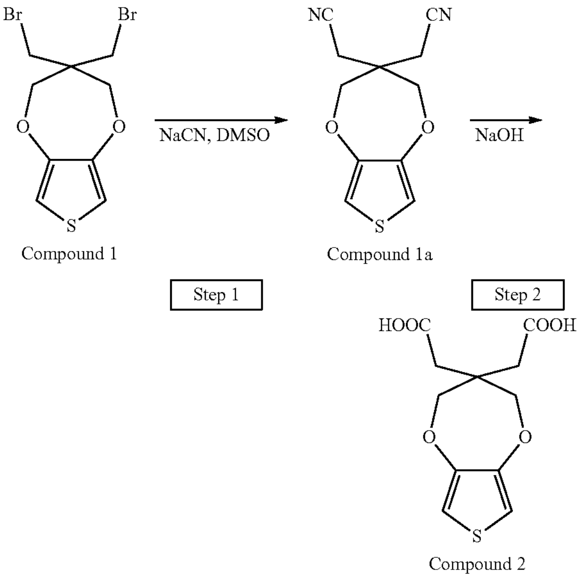

Compound 1

Compound 1a

Compound 2

Step 1:

1.20 g of Compound 1 above (3.51 mmol, 1 eq) and 2.07 g of sodium cyanide (42.26 mmol, 12 eq) were dissolved in 150 ml of dimethyl sulfoxide (hereinafter, DMSO), and stirred at room temperature for 10 days. The mixture was quenched with deionized water, dried over magnesium sulfate ($MgSO_4$), and then evaporated under vacuum to remove the solvent, and the residue was purified by column chromatography eluting with methylene chloride/hexane (2:1) to obtain Compound 1a of Scheme 2.

1 g of Compound 1a above (4.27 mmol, 1 eq) was dissolved in a mixed solution of 100 ml of 1M aqueous sodium hydroxide (NaOH) solution and 100 ml of ethylene glycol, and refluxed at 95° C. for 24 hours. The mixture was cooled to room temperature, and then quenched with 1N hydrochloric acid (HCl) and extracted with diethyl ether. The solution was dried over magnesium sulfate ($MgSO_4$) and then evaporated under vacuum. The residue was precipitated with chloroform to prepare the target compound 2 (3,4-[2,2'-bis(carboxymethyl)propylenedioxy]thiophene) (monomer (A)).

Figure 2:
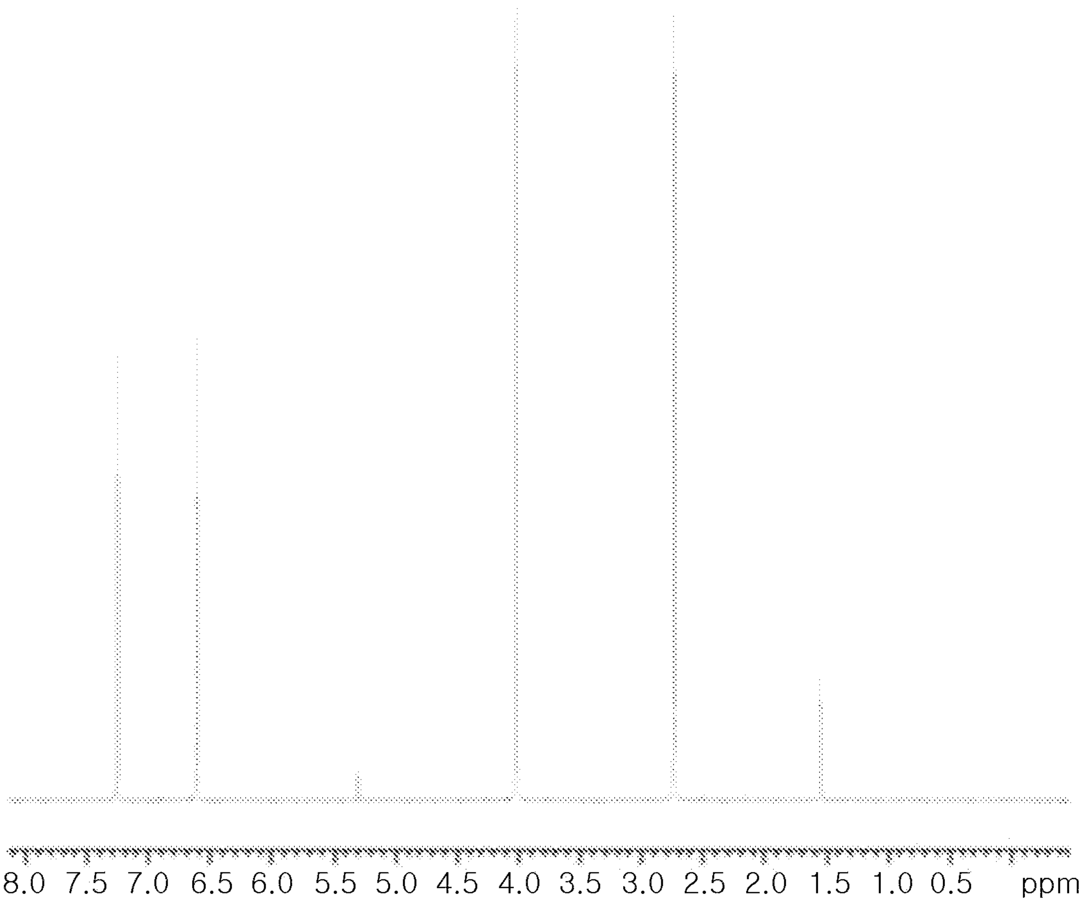
FIG. 2 is an NMR result of the monomer (A) of Preparation Example 1.

The results of NMR analysis of the target compound are the same as FIG. 2.

Preparation Example 2. Synthesis of Monomer (B)

Compound 4 of Scheme 4 below (3,4-(2,2'-bis[2-(2-(2-(2-methoxyethoxy)ethoxy)ethoxy)methyl]propylenedioxy) thiophene) was synthesized in the following manner.

[Scheme 4]

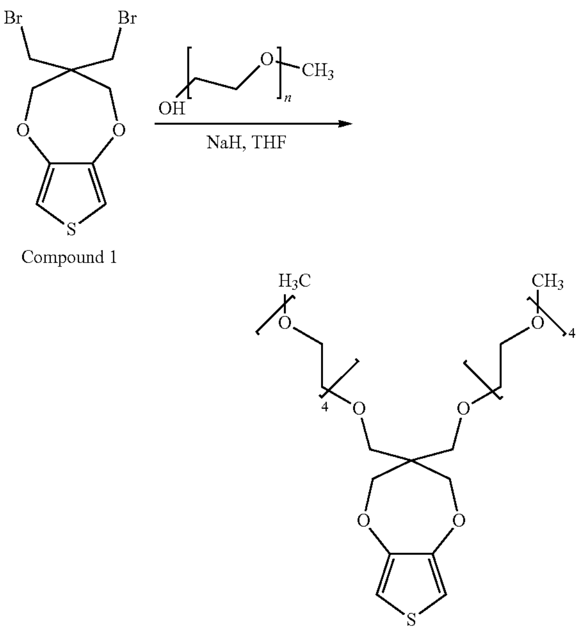

Compound 1

Compound 4

0.561 g of sodium hydride (NaH) (60% with oil, 14.03 mmol, 6 eq) and 62 mg of 18-crown-6-ether (0.234 mmol, 0.1 eq) were dispersed in 15 ml of tetrahydrofuran (hereinafter, THF) under an argon atmosphere. After the dispersion was cooled to 0° C., 0.8 g (2.34 mmol, 1 eq) of Compound 1 formed in Preparation Example 1 was injected thereto, and then stirred at room temperature for 1 hour. After the mixed solution was cooled to 0° C. again, 1.461 g (7.017 mmol, 3 eq) of tetraethylene glycol monomethyl ether was injected thereto and stirred at room temperature for 3 hours, and then heated to 80° C. and further stirred for 24 hours, and then cooled to room temperature and quenched with 1N hydrochloric acid (HCl). The quenched mixed solution was extracted using diethyl ether, and then washed with 1N hydrochloric acid (HCl), and the reactant was dried over magnesium sulfate ($MgSO_4$). The solvent was evaporated with a rotary evaporator, and the residue was purified by column chromatography eluting with methylene chloride/hexanes (1:2) to prepare the target compound 4 (3,4-(2,2'-bis[2-(2)-(2-(2-methoxyethoxy)ethoxy)ethoxy)methyl]propylenedioxy)thiophene) (monomer (B)).

Figure 3:
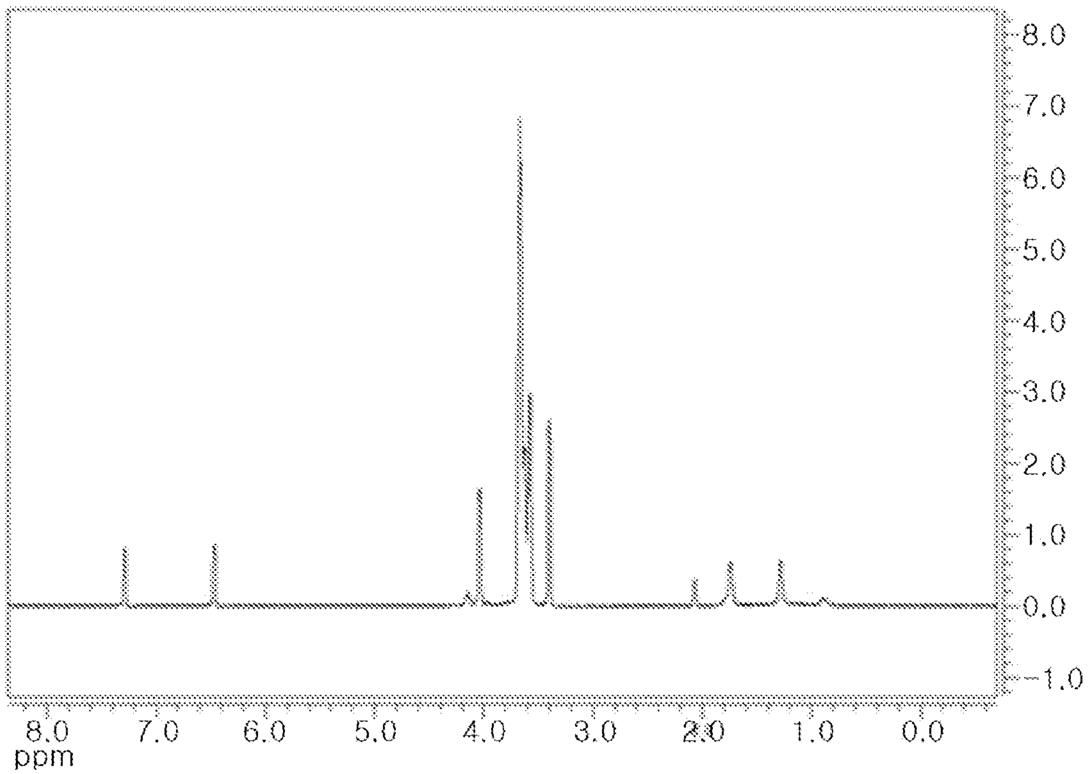
FIG. 3 is an NMR result of the monomer (B) of Preparation Example 2.

The results of NMR analysis of the target compound are the same as FIG. 3.

Preparation Example 3. Synthesis of Polythiophene (A)

1.79 g (6.57 mmol, 1 eq) of the monomer (A) of Preparation Example 1 was introduced to a solution obtained by dissolving 3.20 g (19.71 mmol, 3 eq) of iron (III) chloride in 150 ml of methylene chloride, and polymerized at 25° C. for 24 hours to prepare polythiophene (A). The mixed solution was placed in an osmotic membrane having an MWCO (molecular weight of cut-off) of 5000, and then immersed in 200 ml of an acetonitrile solvent to remove the unreacted iron (III) chloride and monomer (A). The residue deposited inside the osmosis membrane was washed with methanol and dried at 60° C. for 12 hours to prepare polythiophene (A).

The prepared polythiophene (A) had a weight average molecular weight of about 7,500 g/mol, and an oxidation potential of about 2.6 V or so. The oxidation potential was identified with a potentiometer.

Preparation Example 4. Synthesis of Polythiophene (B)

To a solution obtained by dissolving 2.92 g (18 mmol, 6 eq) of iron (III) chloride in 150 ml of methylene chloride, 0.82 g (3.0 mmol, 1 eq) of the monomer (A) of Preparation Example 1 above and 1.79 g (3.0 mmol) of the monomer (B) of Preparation Example 2 were introduced and polymerized at 25° C. for 24 hours to prepare polythiophene (B). The mixed solution was placed in an osmotic membrane having an MWCO (molecular weight of cut-off) of 5000, and then immersed in 200 ml of an acetonitrile solvent to remove the unreacted iron (III) chloride and unreacted monomers. The residue deposited inside the osmosis membrane was washed with methanol and dried at 60° C. for 12 hours to prepare polythiophene (B).

The polythiophene (B) comprised the polymerized unit (A) derived from the monomer (A) and the polymerized unit (B) derived from the monomer (B) in a molar ratio (A:B) of about 1:1, and had a weight average molecular weight of about s 9400 g/mol, and an oxidation potential of about 2.8 V or so. The evaluation method of the oxidation potential is the same as in Preparation Example 3.

Preparation 5. Synthesis of Polythiophene (C)

Polythiophene (C) was synthesized in the same manner as in Preparation Example 4, except that as the monomers, 1.64 g (6.0 mmol, 2 eq) of the monomer (A) of Preparation Example 1 and 1.79 g (3.0 mmol, 1 eq) of the monomer (B) of Preparation Example 2 were used. The polythiophene (C)

had a weight average molecular weight (Mw) of about 7,800 g/mol, and an oxidation potential of about 2.7V.

Preparation Example 6. Synthesis of Polythiophene (D)

Polythiophene (C) was synthesized in the same manner as in Preparation Example 4, except that as the monomers, 1.64 g (6.0 mmol, 2 eq) of the monomer (A) of Preparation Example 1 and 1.19 g (2.0 mmol, 1 eq) of the monomer (B) of Preparation Example 2 were used. The polythiophene (C) had a weight average molecular weight (Mw) of about 8,700 g/mol, and an oxidation potential of about 2.7V.

Example 1

The polythiophene (A) of Preparation Example 3 was dispersed at a concentration of about 5 weight % in chloroform to prepare a coating composition.

The coating composition was coated using a doctor blade on a lithium metal film having a thickness of about 40 μm or so formed on a current collector as a copper foil, and dried at 90° C. for 10 minutes to form a thiophene polymer layer having a thickness of about 500 nm or so, thereby preparing an electrode.

Example 2

An electrode was prepared in the same manner as in Example 1, except that the polythiophene (B) of Preparation Example 4 was used.

Example 3

An electrode was prepared in the same manner as in Example 1, except that the polythiophene (C) of Preparation Example 5 was used.

Example 4

An electrode was prepared in the same manner as in Example 1, except that the polythiophene (D) of Preparation Example 6 was used.

Comparative Example 1

A lithium metal film having a thickness of about ~ or so formed on a current collector as a copper foil, was applied as an electrode as such without additional treatment.

The evaluation results of the Examples and Comparative Examples were summarized and described in Table 1 below.

TABLE 1

| | Lithium ionic conductivity | Cycle retention |
|---|---|---|
| Example 1 | $6.3 \times 10^{-3}$ S/cm | 80% |
| Example 2 | $5.1 \times 10^{-3}$ S/cm | 85% |
| Example 3 | $7.0 \times 10^{-3}$ S/cm | 75% |
| Example 4 | $1.1 \times 10^{-3}$ S/cm | 65% |
| Comparative Example 1 | — | 20% |

The invention claimed is:

1. An electrode, comprising:

a current collector;

a lithium layer formed on the current collector; and a thiophene polymer layer formed on the lithium layer and comprising a thiophene polymer having a functional group selected from a first functional group, a second functional group, or a combination thereof, wherein the first functional group is selected from a carboxyl group, a hydroxy group, a nitro group, an amino group, an ether group, a carbonyl group, or a combination thereof, wherein the thiophene polymer layer has a thickness in a range of 400 nm to 10 μm, and wherein the thiophene polymer comprises a polymerized unit of Formula 2:

[Formula 2]

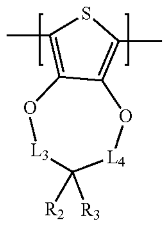

wherein, $L_3$ and $L_4$ are each independently a single bond or an alkylene group, $R_2$ is a carboxyl group, a carboxylalkyl group, a hydroxy group, a hydroxyalkyl group, an amino group, an aminoalkyl group, a nitro group, an ether-containing group, a carbonyl-containing group or the second functional group, and $R_3$ is hydrogen, a carboxyl group, a carboxylalkyl group, a hydroxy group, a hydroxyalkyl group, an amino group, an aminoalkyl group, a nitro group, an ether-containing group, a carbonyl-containing group or the second functional group, and at least one of $R_2$ or $R_3$ is a carboxyl group, a carboxylalkyl group, a hydroxy group, a hydroxyalkyl group, an amino group, an aminoalkyl group, or a nitro group.

2. The electrode according to claim 1, wherein the lithium layer has a thickness in a range of 10 μm to 50 μm.

3. The electrode according to claim 1, wherein the second functional group is an alkyl group with 3 or more carbon atoms, an alkoxy group with 3 or more carbon atoms, an alkylcarbonyl group having an alkyl group with 3 or more carbon atoms, an alkylcarbonyloxy group having an alkyl group with 3 or more carbon atoms, or a group of the Formula 1:

[Formula 1]

$$—L_1—[O—L_2]_n—O—R_1$$

wherein, $L_1$ is a single bond or an alkylene group, $L_2$ is an alkylene group, $R_1$ is an alkyl group, and n is a number within a range of 1 to 10.

4. The electrode according to claim 1, wherein in the thiophene polymer layer, a ratio (M/S) of a mole number (M) of the functional group to a mole number (S) of sulfur atoms is in a range of 0.1 to 10.

5. The electrode according to claim 1, wherein the thiophene polymer simultaneously comprises a first functional group, and a second functional group.

6. The electrode according to claim 5, wherein a ratio (M1/M2) of a mole number (M1) of the first functional group to a mole number (M2) of the second functional group is in a range of 0.5 to 10.

7. The electrode according to claim 1, wherein at least one of $L_3$ or $L_4$ is an alkylene group, and the sum of carbon atoms present in $L_3$ and $L_4$ is in a range of 1 to 20.

8. An electrode, comprising:

a current collector;

a lithium layer formed on the current collector; and a thiophene polymer layer formed on the lithium layer and comprising a thiophene polymer having a functional group selected from a first functional group, a second functional group, or a combination thereof, wherein the first functional group is selected from a carboxyl group, a hydroxy group, a nitro group, an amino group, an ether group, a carbonyl group, or a combination thereof, wherein the thiophene polymer simultaneously comprises a polymerized unit of Formula 3 and a polymerized unit of Formula 4:

[Formula 3]

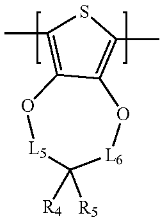

wherein, $L_5$ and $L_6$ are each independently a single bond or an alkylene group, $R_4$ is a carboxyl group, a carboxyalkyl group, a hydroxy group, a hydroxyalkyl group, an amino group, an aminoalkyl group, a nitro group, an ether-containing group or a carbonyl-containing group, and $R_5$ is hydrogen, a carboxyl group, a carboxylalkyl group, a hydroxy group, a hydroxyalkyl group, an amino group, an aminoalkyl group, a nitro group, an ether-containing group or a carbonyl-containing group:

[Formula 4]

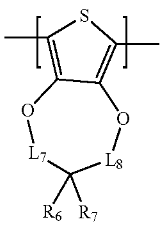

wherein, $L_7$ and $L_8$ are each independently a single bond or an alkylene group, $R_6$ is the second functional group, and $R_7$ is hydrogen or the second functional group.

9. The electrode according to claim 8, wherein a ratio (M4/M5) of a mole number (M4) of the polymerized unit of Formula 3 to a mole number (M5) of the polymerized unit of Formula 4 is in a range of 0.1 to 10.

10. The electrode according to claim 1, wherein the thiophene polymer has a weight average molecular weight in a range of 500 to 100,000 g/mol.

11. The electrode according to claim 1, wherein the thiophene polymer has an oxidation potential in a range of 1.5 to 5V.

12. A method for manufacturing an electrode, comprising:

forming a thiophene polymer layer on a laminate comprising a current collector and a lithium layer, wherein the thiophene polymer layer comprises a thiophene polymer having a functional group selected from a first functional group, a second functional group, or a combination thereof, and wherein the first functional group is selected from a carboxyl group, a hydroxy group, a nitro group, an amino group, an ether group, a carbonyl group or a combination thereof, and wherein the thiophene polymer layer has a thickness in a range of 100 nm to 10 μm, and wherein the thiophene polymer comprises a polymerized unit of Formula 2:

[Formula 2]

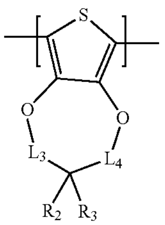

wherein, $L_3$ and $L_4$ are each independently a single bond or an alkylene group, $R_2$ is a carboxyl group, a carboxylalkyl group, a hydroxy group, a hydroxyalkyl group, an amino group, an aminoalkyl group, a nitro group, an ether-containing group, a carbonyl-containing group or the second functional group, and $R_3$ is hydrogen, a carboxyl group, a carboxylalkyl group, a hydroxy group, a hydroxyalkyl group, an amino group, an aminoalkyl group, a nitro group, an ether-containing group, a carbonyl-containing group or the second functional group, and at least one of $R_2$ or $R_3$ is a carboxyl group, a carboxylalkyl group, a hydroxy group, a hydroxyalkyl group, an amino group, an aminoalkyl group, or a nitro group.

13. The method for manufacturing an electrode according to claim 12, wherein the thiophene polymer layer is formed by coating a coating composition on the lithium layer, wherein the coating composition comprises the thiophene polymer.

14. The method for manufacturing an electrode according to claim 12, wherein the thiophene polymer layer is formed by polymerizing a thiophene monomer on the lithium layer.

15. The method for manufacturing an electrode according to claim 14, wherein the thiophene-based monomer is represented by Formula 5:

[Formula 5]

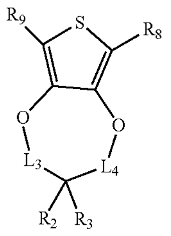

wherein, $L_3$ and $L_4$ are each independently a single bond or an alkylene group, $R_2$ is a carboxyl group, a carboxylalkyl group, a hydroxy group, a hydroxyalkyl group, an amino group, an aminoalkyl group, a nitro group, an ether-containing group, a carbonyl-containing group or the second functional group, $R_3$ is hydrogen, a carboxyl group, a carboxylalkyl group, a hydroxy group, a hydroxyalkyl group, an amino group, an aminoalkyl group, a nitro group, an ether-containing group, a carbonyl-containing group or the second functional group, at least one of $R_2$ or $R_3$ is a carboxyl group, a carboxylalkyl group, a hydroxy group, a hydroxyalkyl group, an amino group, an aminoalkyl group, or a nitro group, and $R_8$ and $R_9$ are each independently hydrogen or halogen.

16. A secondary battery comprising the electrode of claim 1.

17. The electrode according to claim 1, wherein the lithium layer comprises lithium or a lithium alloy.

* * * * *